United States Patent [19]

Brown, Jr.

[11] 3,733,966

[45] May 22, 1973

[54] HYDRAULIC POWER BRAKE BOOSTER

[75] Inventor: Arthur King Brown, Jr., South Bend, Ind.

[73] Assignee: The Bendix Corporation, South Bend, Ind.

[22] Filed: Mar. 24, 1971

[21] Appl. No.: 127,684

[52] U.S. Cl. .................... 91/372, 91/378, 91/391 R, 91/417
[51] Int. Cl. ...... F15b 13/16, F15b 13/10, F15b 15/17
[58] Field of Search ...................... 91/391 R, 391 A, 91/165, 417, 372, 378

[56] References Cited

UNITED STATES PATENTS

| | | |
|---|---|---|
| 2,755,891 | 7/1956 | Levell et al. .................. 91/391 A |
| 3,208,212 | 9/1965 | Schultz .......................... 91/391 A |
| 3,610,101 | 10/1971 | Meyers .......................... 91/391 R |

Primary Examiner—Paul E. Maslousky
Attorney—Ken C. Decker and Plante, Hartz, Smith & Thompson

[57] ABSTRACT

A hydraulic power brake booster which utilizes open center valve means positioned concentrically of the booster piston in a manner to provide follow up action therebetween. The valve is equipped with a trim adjustment for regulating flow between the ports and to the respective ends of the booster piston. Operator-operated means including lever means is interconnected between the valve means and booster piston means to establish one ratio of lever to piston movement for power actuation and a different, higher ratio, of lever to piston movement for no-power.

9 Claims, 5 Drawing Figures

INVENTOR.
ARTHUR K. BROWN JR.

INVENTOR.
ARTHUR K. BROWN JR.
BY Ken C. Decker

HYDRAULIC POWER BRAKE BOOSTER

BACKGROUND OF THE INVENTION

The present invention in general relates to a fluid operated booster for converting a manual input force into an amplified output force. More particularly the invention concerns such a fluid operated booster wherein valve means and piston means are so interconnected that in the event of a failure of the fluid pressure the booster piston is operated manually by an applying force not too different from the force required to operate a conventional non-power braking system. The booster is of particular utility in associated with a master cylinder of a hydraulic braking system and for convenience will be shown in such relationship.

Reference is made to U. S. Pat. Nos. 2,766,732; 3,119,235 and 3,267,663, assigned to the common assignee for this invention, as showing fluid boosters of the aforementioned general character. The present invention relates to improvements on the boosters of such patents.

SUMMARY OF THE INVENTION

The principal object of the invention is to provide a fluid operated booster of the foregoing type having means for manually operating the booster piston at a higher ratio of foot pedal to piston movement upon failure of the fluid pressure than that ratio employed to operate the piston with fluid pressure available.

Another object of the invention is to provide trim adjustment means for the open center valve means utilized in the booster to obtain the proper differential pressure acting on the respective ends of the booster piston for returning it to the unapplied or released position.

A still further object of the invention is to provide a fluid operated booster of the foregoing construction requiring only two hose connections, one to the pump and one to the steering gear.

An important object of the invention resides in the provision of a fluid pressure system for a vehicle having an open center valve steering gear connected in series flow relationship with a brake boost mechanism, the combina-tion of which includes valve means for dividing system pressure between said steering gear and said mechanism.

The above and other important objects and features of the invention will be apparent from the following description of the mechanism taken in connection with the accompanying drawings which form a part of this specification.

DETAIL DESCRIPTION

Figure 1:
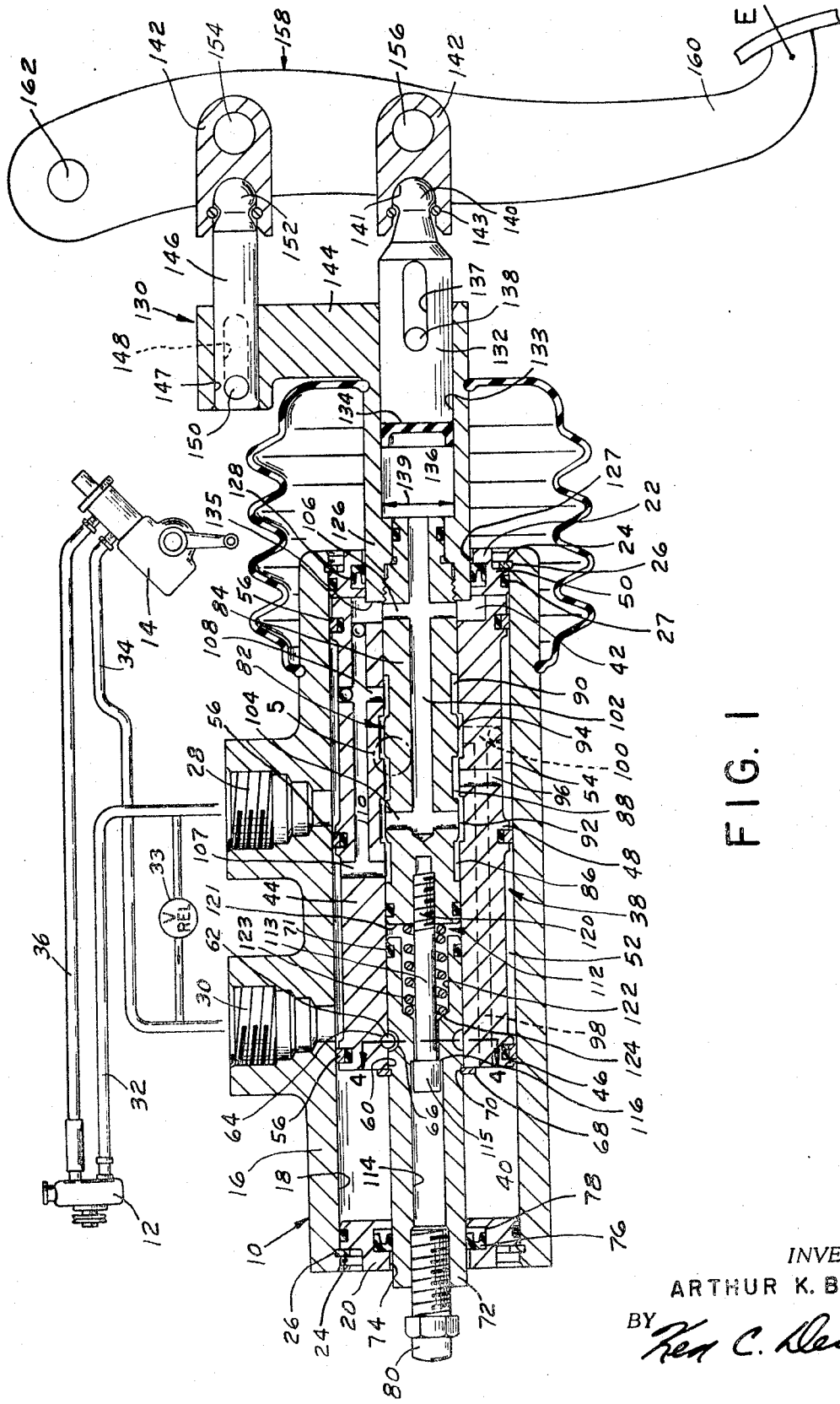
FIG. 1 is a view, partially in section, of a hydraulic power booster constructed in accordance with the invention which is disclosed in association with other elements of the vehicle hydraulic system illustrated schematically.

Referring to FIG. 1 it will be noted that reference numeral 10 designates a fluid operated boost mechanism installed in a vehicle hydraulic system having an engine driven pump 12 and a steering gear 14 operatively connected to the vehicle wheels, not shown, in a manner well known to those skilled in the art. The boost mechanism 10, which may be termed more specifically a hydraulic brake booster since its principal use is in conjunction with a brake master cylinder, not shown, comprises a housing means 16 provided with cylinder means 18 including end closure members 20 and 22 held in their respective locations by snap rings 24 secured in grooves 26 in the cylinder means. The end closures 20 and 22 are equipped with the necessary sealing elements 27 to prevent the escape of fluid from said cylinder means to atmosphere. Inlet and outlet ports 28 and 30, respectively, are formed in the housing means at axially spaced locations in communication with said cylinder means. The inlet port 28 is connected to the outlet of the pump 12 by conduit 32. The outlet port 30 is in fluid communication with the steering gear 14 via pipe line 34. Fluid return from the steering gear 14 is connected to the inlet of the pump 12 by conduit 36, thus providing for recirculation of the fluid. The steering gear 14 per se will not be described in detail since it is not a part of the invention. However, it should be mentioned that the gear is of the conventional open center valve construction as shown in U. S. Pat. No. 1,790,620. During non-steering conditions the valve allows fluid to freely circulate therethrough. During steering conditions the amount of fluid passing through the steering gear valve is determined by the severity of the steering requirement.

The boost mechanism 10 is connected in series flow relationship to the steering gear 14, thus requiring only two connections in the housing means 16, one to the inlet port 28 and the other to the exhaust port 30. With such an arrangement the boost mechanism 10 must share system pressure with the steering gear 14 at times of simultaneous operation. To insure sharing, a pressure relief valve 33 is connected between the inlet port 28 and exhaust port 30. The setting of the valve 33 is determined by the minimum operating pressure requirements of the booster.

Figure 4:
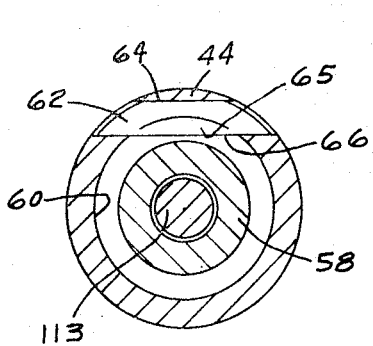
FIG. 4 is a sectional view taken along the line 4—4 of FIG. 1.

Reciprocally positioned within the cylinder means 18 is piston means 38, which together with said cylinder means divides the latter into two chambers 40 and 42, located at the respective ends of piston means. The piston means includes a piston member 44 provided with lands 46, 48 and 50. A circumferential recess or cavity 52 is formed between the lands 46 and 48 and circumferential recess or cavity 54 is formed between the lands 48 and 50. Each of the lands 46, 48 and 50 is equipped with appropriate sealing means 56 to maintain the desired pressures in the chambers 40 and 42 and cavities 52 and 54. The cavities 52 and 54 are of such axial lengths as to maintain continuous communication with the exhaust port 30 and the inlet port 28, respectively, during full piston stroke in the cylinder means 18. The piston means further includes a tubular member 58 secured in an axially extending central bore 60 of the piston member 44 by a locking pin 62 located in a transverse bore 64 of the piston 44, as best shown in FIG. 4. The transverse bore 64 opens into the central bore 60 so that a portion 65 of the pin 62 extends into an annular groove 66 of the tubular member 58. The groove 66 is slightly over-size with respect to the pin 62 to allow for misalignment between the pin and groove during assembly of the parts. A snap ring 68 fits into a groove 70 of the member 58 to further secure the piston 44 to the tubular member 58 for driving engagement. An O-ring 71 provides sealing between the tubular member 58 and the piston 44. End 72 of the member 58 projects through an opening 74 of member 20. A packing and sealing gland 76 is carried in circumferential groove 78 of the end closure 20 to thereby seal the chamber 40 from leakage. A force transmitting rod 80 has one end threadedly secured to the member 58 and its other end connected to a hydraulic brake master cylinder, not shown, for actuating the same, in a manner well known to those skilled in the art.

Figure 5:
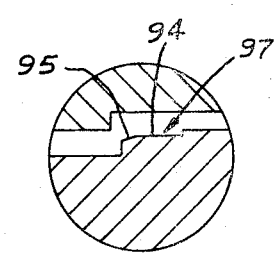
FIG. 5 is a fragmentary section showing the chamfer on the spool valve.

Valve means 82 of the open center type controls the operation of the boost mechanism 10. The valve means 82 includes a spool member 84 which is concentrically located in the bore 60 of the piston member 44 for controlling fluid pressure in the chambers 40 and 42 of the cylinder means. The valve spool 84 is formed with annular channels 86, 88 and 90 which cooperate with annular channels 92 and 94 formed in the central bore 60 for regulating fluid flow between the ports 28 and 30 and the two chambers 40 and 42. Inlet fluid pressure is communicated from the recess 54 to channel 88 through a radial passage 96. A longitudinal passage 98 in the piston wall intersects a radial passage 100 also in the piston wall to establish a fluid connection between the channel 94 and the chamber 40, at the left end of the piston as viewed in FIG. 1. Communication between the chamber 42, at the right end of the piston as viewed in FIG. 1, and the channel 92 is through longitudinal passage 102 and radial passages 104 and 106 in the spool valve 84. Recess 52, in continuous communication with the exhaust port 30, is in fluid communication with channels 86 and 90 through radial passages 107 and 108 and a longitudinal passage 110 which intersects said radial passages. It is to be noted that the effective areas of the opposite ends of the piston member 44 exposed to chambers 40 and 42 are equal. This becomes apparent when it is realized that the outside diameter of member 58 is the same as the outside diameter of spool valve 84. With particular reference to FIG. 5, it is seen that the land opposite channel 94 is chamfered at 95 so that maximum shifting of the spool to the left will not reduce fluid flow at the exhaust port 30 to a level insufficient to operate the steering gear 14. The chamfer provides a bypass orifice 97 which insures continuous flow from port 30.

In order to establish the desired fluid pressure levels in the various channels and chambers of the boost mechanism, the valve means 82 is equipped with adjusting means 112 for trimming the valve as needed. The adjusting means 112 includes a screw 113 slidably received in passage 114 of the tubular member 58 so that head 115 of the screw engages a shoulder 116 to permit axial movement or trimming of the spool by threading end 118 of the screw in or out of the threaded bore 120 of the spool. The passage 114 is counterbored at 122 for receiving a valve centering spring 123 through which the screw 113 passes. The spring is interposed between an end 121 of the valve spool and a shoulder 124 located at the bottom of the counterbore. The means 112 adjustably selects the valve spool position in which the back pressure in chamber 40 is higher than the back pressure in chamber 42 to assist in returning the piston 44 to the brake booster released position. The spring 123 retains the spool in its adjusted position but allows for axial displacement of the spool in response to a brake application. The valve spool 84 is threadedly secured to a hollow extension member 126 which passes through an opening 127 of the end closure 22. A packing gland 128 located in the end member 22 seals the chamber 42 from fluid leakage between the closure member and the valve spool extension 126. The valve means 82 and piston means 38 are operatively connected to operator-operated means 130.

The operator-operated means 130 is a dual ratio mechanism, establishing a low pedal or lever ratio for fluid actuation of said piston 44 and a higher pedal or lever ratio for solely manual actuation of said piston. The means 130 includes a link or plunger 132 slidably carried in bore 133 of the hollow extension member 126. The inner end of the plunger 132 is provided with a rubber cup 134 which seals chamber 136, in communication with the passage 102 of the spool 84, from fluid leakage between the plunger and the bore 133. It is to be noted that the reaction area 135 formed on the annulus at the inner end of the extension 126 is less than the reaction area 139 developed across the diameter of the bore 133 in chamber 136. This relationship of areas is essential to actuation of the valve means 82. The plunger 132 is formed with a slot 137 through which a pin 138 passes. The pin 138 is transversely positioned across the central portion of the bore 133 with the ends of the pin being secured in the walls of the extension 126. The pin 138 not only retains the link 132 in the bore 133 but it controls its travel. The end of the plunger 132 opposite the cup 134 is provided with a rounded or spherical end portion 140 over which a cap member 142 fits. The cap 142 is shaped concavely at 141 to furnish a bearing surface on which the end 140 seats to permit rocking or swiveling action of the cap with respect to the link 132. A locking ring 143 retains the cap on the end portion 140. The hollow extension member 126 is formed with a radial extending arm 144 integrally attached to the outermost extremity of said hollow extension. The arm 144 slidably receives a link or plunger 146 in a bearing 147. The link 146 is spaced radially from the link 132 and is slidable parallel to the latter link, i.e., the links 132 and 146 have relative movement in parallel planes. The bearing 147 is provided with axially extending laterally opposed slots 148 in which a pin 150 reciprocates. The pin 150 is fixed at its midpoint to the link 146 at right angles thereto so that the respective ends of the pin ride in their associated slots for driving engagement with the arm 144. The link 146 is also equipped with a cap member 142 suitably attached to the spherical end 152 of said link. The two cap members 142 are drivably connected through bearing members 154 and 156 to lever means 158 which also includes a lever or foot pedal member 160 pivotally supported at 162 to a fixed part of a vehicle, not shown, with which the boost device is used. It will be observed that this four bar linkage comprising lever 160, arm 144 and links 132 and 146 includes a second class lever type formed by the foot pedal member 160 which is pivoted at 162, in which the operator's effort is applied to the pedal member at E to overcome the resistance appearing at bearing members 154 or 156, as the case may be. An inspection of the lever means 158 reveals that the mechanical advantage of the lever means is greater, i.e., has a higher ratio, when applying a force at E to overcome the resistance offered at bearing 154 than when applying a force at E to overcome the resistance offered at bearing 156. This mechanical advantage is in the relationship of the ratio of the effort arm (distance from pivot 162 to point of applied effort E) to the resistance arm (distance from pivot 162 to bearing 154 or 156). The lever means 158 establishes a lower lever ratio of pedal movement versus piston movement with power actuation of said piston and a higher lever ratio of pedal to piston movement with manual actuation of said piston.

MODE OF OPERATION

The brake booster of FIG. 1 is shown in its brake released position. Fluid under pressure from the pump 12 enters at the inlet port 28, and flows freely through the open center valve means 82 to the exhaust port 30, from which the fluid passes through line 34 to the steering gear 14 and thence to the return side of the pump. In the released position the fluid pressure levels in the booster will vary. For example, the back pressure in the cavity 54, passage 96 and annular channel 88 is greater than that in annular channel 92, longitudinal passage 102, radial passage 106 and chambers 42 and 136. Also, the back pressure in the annular channels 86 and 90, passages 107, 108 and 110, and cavity 52 is less than that in annular channel 92, passages 102 and 106 and chambers 42 and 136. However, it is to be noted that in the brake released position of the booster the back pressure in the chamber 40 is greater than that prevailing in the chamber 42. Establishing a pressure differential across the piston ends exposed to the pressures in the chambers 40 and 42 as aforesaid assists in returning the piston means 38 to its position of FIG. 1. This is achieved by the adjusting means 112 which trims the valve means to its desired position to establish the pressure levels needed.

Figure 2:
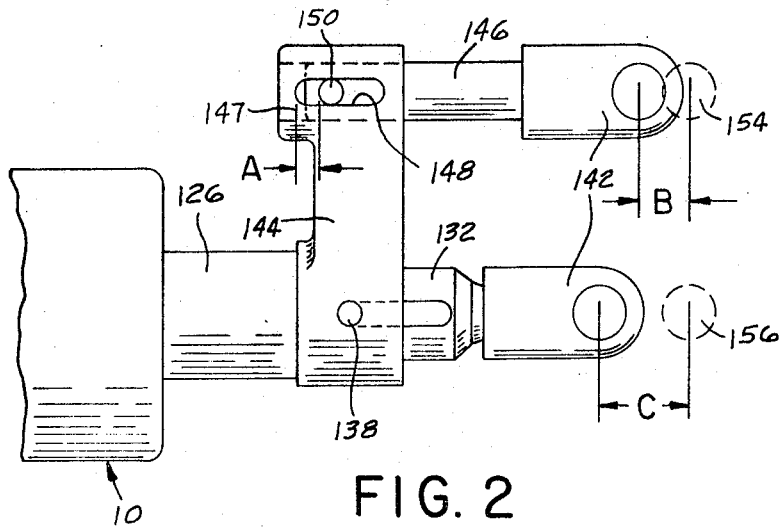
FIG. 2 is a schematic view showing the relative positions of certain parts of the ratio changer mechanism resulting from a typical power application.

To place the booster in brake applying position with power available, the lever or pedal 160 is depressed by the operator. This pedal movement causes the extension member 126 and spool valve member 84 to shift to the left, as viewed in FIG. 1, thus communicating the chamber 42, on the right end of the piston to inlet port pressure via annular channel 92 and longitudinal passage 102 and communicating the chamber 40 at the left end of the piston with a back pressure less than the pressure in chamber 42 but somewhat greater than exhaust port pressure via passages 98 and 100, and annular channels 94 and 90. Accordingly, a differential pressure is created across the piston 44 acting in a manner displacing the piston to the left so as to follow the valve spool displacement. Further pedal movement will continue to actuate the valve means 82, causing follow up of the piston means 38. It will be observed that under normal operation of the boost mechanism 10 depressing pedal 160 moves the link 132, extension member 126 and spool valve 84 as a single unit, notwithstanding the fluid connection between the plunger or link 32 and the extension member 126. This is so because the fluid in chamber 136 is pressurized, thus functioning as a solid connection between the link 132 and the member 126. It will be recalled also that the area created by the diameter of the chamber 136 is greater than the area of the annulus 135 so that the net force developed in the chambers 42 and 136 acting on the spool valve and extension member is in a direction causing movement of the spool valve to the left. The fluid pressure in the chamber 136 also acts against the end of the link 132 to transmit brake feel to the operator. With reference to FIG. 2, during a power application of the boost mechanism 10, it can be seen that link 132, extension member 126, and spool valve 84 move as a unit since the pin 138 and slot 137 are in their same relative positions after a brake application as before. However, the pin 150 which is fixed to the link 146 is no longer in engagement with the end of slot 148 formed in the walls of the bearing 147 but has separated a distance A. Also, during the power application of the boost mechanism link 146 has moved a distance B and link 132 has traveled a distance C. The distance C is equal to the sum of the distances A plus B.

Figure 3:
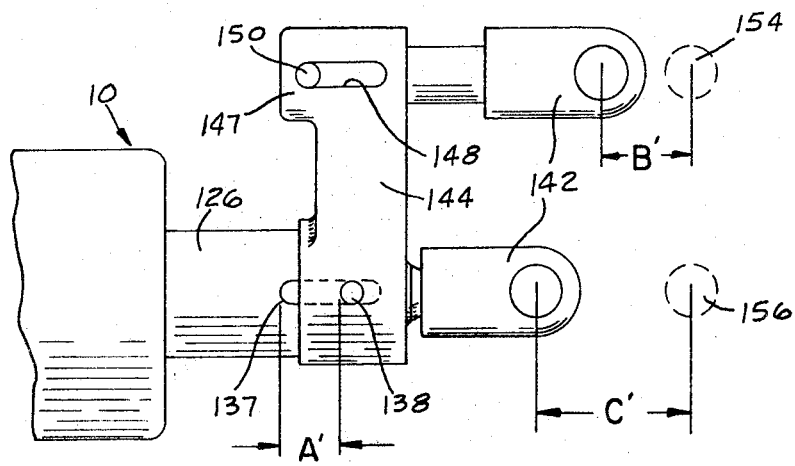
FIG. 3 is a schematic view showing the relative positions of certain parts of the ratio changer mechanism resulting from a typical no power application.

In the event of failure of fluid pressure for making a power brake application, the booster is operated by depressing the lever 160 in the same manner as for power. In the no-power condition of the booster 10, the link 132, attached to the lever 160 by bearing 156, moves into the chamber 136 causing separation between the pin 138, secured in the extension member 126, and the end of slot 137 in the link or piston 132, as best seen in FIG. 3. This separation is shown to be A'. At the same time the center of pivot of bearing 156 has traveled an amount B'. Simultaneously therewith, the center of pivot of bearing 154, which is closer to the fixed pivot 162 than is the center of pivot of bearing 156, has moved only a distance of C'. Therefore, the distance C' traveled by the center of pivot of bearing 154 is equal to the distance B' traveled by the center of pivot of bearing 156 less the distance A' which represents the separation between pin 138 and the left end of slot 137, as shown in FIG. 3. This relationship illustrates the high pedal ratio of the four bar linkage for no power operation of the booster. As the lever 160 is rotated about the fixed pivot 162, from the solid line position to the dotted line position of said lever 160, the member 126 and spool 84 are shifted to the left until the centering spring 123 is collapsed, at which time the end 121 of the valve spool drivably engages the inner end of the tubular member 58 contiguous said end 121. The tubular member 58 together with the force transmitting rod 80 are now moved down the cylinder 18 solely by manual effort applied at E through a high ratio linkage at a relatively low effort. During this movement of the piston means 38 into the chamber 40 fluid is displaced through passages 98 and 100 into annular channel 94 where the fluid flow is diverted into other channels and cavities of the booster mechanism and finally to exhaust port 30.

I claim:

1. In a fluid operated boost mechanism for a vehicle, the combination of:
   housing means provided with cylinder means therein;
   inlet and outlet ports in said housing in communication with said cylinder means;
   piston means reciprocable in said cylinder means;
   said piston means and said cylinder means together forming two chambers, located at the respective ends of said piston means;
   valve means located concentrically of said piston means for regulating fluid flow between said ports and to said two chambers; and operator-operated means including valve actuating means for actuating said valve means to cause movement of said piston means by fluid under pressure acting thereon and further including means for actuating said piston means solely by manual effort;

said operator-operated means also including lever means interconnecting said valve actuating means and said means for manually actuating said piston for establishing a low lever ratio for fluid actuation of said piston and a higher lever ratio for manual actuation of said piston;

said valve means having adjusting means for trimming the valve so that when the operator-operated means is released fluid pressure is greater in one of said two chambers than in the other to thereby assist in returning said piston means to one end of said cylinder, said valve means is an open center valve equipped with a by-pass orifice which supplies a regulated but continuous flow of fluid between the inlet and outlet ports.

2. The combination as defined in claim 1, wherein said adjustment comprises a valve trim screw member coaxially carried in said piston means and said valve means, said screw having one end engaging said piston means and its other end threaded into the spool of said valve means, and a spring interposed between said piston means and said spool for retaining said spool in its adjusted position in said valve means and for maintaining a space between said piston means and that end of said spool adjacent thereto to permit relative movement therebetween.

3. The combination as defined in claim 2, wherein said piston means forms an abutment for engagement by said adjacent end of said spool when the latter moves into said space upon manual actuation of said piston means.

4. In a fluid operated boost mechanism for a vehicle, the combination of:

housing means provided with cylinder means therein;
inlet and outlet ports in said housing in communication with said cylinder means;
piston means reciprocable in said cylinder means;
said piston means and said cylinder means together forming two chambers, located at the respective ends of said piston means;
valve means located concentrically of said piston means for regulating fluid flow between said ports and to said two chambers; and
operator-operated means including valve actuating means for actuating said valve means to cause movement of said piston means by fluid under pressure acting thereon and further including means for actuating said piston means solely by manual effort;

said operator-operated means also including lever means interconnecting said valve actuating means and said means for manually actuating said piston for establishing a low lever ratio for fluid actuation of said piston and a higher lever ratio for manual actuation of said piston;

said lever being pivotally fixed at one end and provided with a foot engaging portion at its free end;
said valve actuating means including a first linkage connected to said valve means and to said lever;
said means for manually actuating said piston including a second linkage connected to said valve means and to said lever at a point closer to the fixed pivot than said first linkage to thereby establish a mechanical advantage over said first linkage, said first linkage including a hydraulic connection.

5. In a fluid operated boost mechanism for a vehicle, the combination of:

housing means provided with cylinder means therein;
inlet and outlet ports in said housing in communication with said cylinder means;
piston means reciprocable in said cylinder means;
said piston means and said cylinder means together forming two chambers, located at the respective ends of said piston means;
valve means located concentrically of said piston means for regulating fluid flow between said ports and to said two chambers; and
operator-operated means including valve actuating means for actuating said valve means to cause movement of said piston means by fluid under pressure acting thereon and further including means for actuating said piston means solely by manual effort;

said operator-operated means also including lever means interconnecting said valve actuating means and said means for manually actuating said piston for establishing a low lever ratio for fluid actuation of said piston and a higher lever ratio for manual actuation of said piston;

said means for actuating said valve means including a fluid connection and said means for actuating said piston means solely by manual effort comprises a mechanical connection.

6. In a fluid pressure system for a vehicle having an open center valve steering gear in fluid flow communication with a source of fluid via a boost mechanism, said boost mechanism comprising:

housing means including cylinder means therein;
inlet and exhaust ports in said housing communicating with said cylinder means and providing for the fluid communication with said source and said open center valve steering gear;
piston means reciprocable in said cylinder means;
said piston means and said cylinder means together forming two chambers, located at the respective ends of said piston means;
valve means concentrically located with respect to said piston means for controlling fluid flow between said ports and to said two chambers; and
operator-operated means for actuating said valve means from a released position to an applied position to cause movement of said piston means under the influence of fluid pressure and further including means for actuating said piston means solely through manual effort;

said valve means being provided with means for trimming said valve so that the fluid pressure differential acting in said chambers is such as to assist in returning said piston means to its unapplied position upon return of the valve means to its released position.

7. The combination as defined in claim 6, wherein said valve means includes a by-pass orifice which supplies a continuous but regulated flow of fluid to said steering gear valve.

8. The combination as defined in claim 6, wherein relief valve means is connected between said ports to insure fluid pressure sharing between said steering gear and said boost mechanism.

9. In a hydraulic power brake boost mechanism having piston means to be controlled by valve means of an open center type positioned coaxially of said piston means and movable from a released position to an applied position to actuate said brake boost mechanism, and a dual ratio mechanism connected to both said means for establishing a low lever ratio for hydraulic actuation of said piston means and higher lever ratio for solely manual actuation of said piston means, an improvement for adjusting said valve means so that upon movement of the valve means to its released position, a pressure differential acts across said piston means to assist in returning said piston means, said improvement comprising:

and means connecting said piston means with said valve means to trim the latter to create a higher back pressure on one end of said piston means than at the other end, to thereby return said piston means as aforesaid.

* * * * *